United States Patent [19]

Okazaki et al.

[11] Patent Number: 4,830,448
[45] Date of Patent: * May 16, 1989

[54] LIGHT MODULATOR AND WAVE GUIDE DEVICE

[75] Inventors: Yoji Okazaki; Hiroshi Sunagawa; Kozi Kamiyama, all of Kanagawa, Japan

[73] Assignee: Fuji Photo Film Co., Ltd., Kanagawa, Japan

[*] Notice: The portion of the term of this patent subsequent to Jul. 19, 2005 has been disclaimed.

[21] Appl. No.: 917,058

[22] Filed: Oct. 9, 1986

[30] Foreign Application Priority Data

Oct. 11, 1985 [JP] Japan .................................. 60-226060
Oct. 16, 1985 [JP] Japan .................................. 60-230290

[51] Int. Cl.$^4$ ............................................... G02F 1/29
[52] U.S. Cl. ................................ 350/96.13; 350/96.14
[58] Field of Search ........................... 350/96.13, 96.14

[56] References Cited

U.S. PATENT DOCUMENTS

| 4,039,249 | 8/1977 | Kaminow et al. | 350/96.13 X |
| 4,047,795 | 9/1977 | Hughes et al. | |
| 4,648,687 | 3/1987 | Yoshida et al. | 350/96.14 X |
| 4,685,766 | 8/1987 | Nishimura et al. | 350/96.34 X |

FOREIGN PATENT DOCUMENTS

| 0104634 | 4/1984 | European Pat. Off. | |
| 58-130327 | 8/1983 | Japan | |
| 59-69732 | 4/1984 | Japan | |
| 966650 | 10/1982 | U.S.S.R. | 350/96.14 |

OTHER PUBLICATIONS

Optics and Spectroscopy, vol. 45, No. 5, 11/1987, pp. 791–792.

Primary Examiner—Paul Gensler
Attorney, Agent, or Firm—Gerald J. Ferguson, Jr.

[57] ABSTRACT

A light modulator comprises a stack of a wave guide layer and an adjacent layer normally exhibiting a refractive index smaller than that of the wave guide layer, at least one of these layers being formed of a material whose refractive index changes by application of energy. An energy applicator is provided at least in one of these layers, and a dielectric grating is positioned at the surface of the adjacent layer over a section where energy is applied by the energy applicator. A drive circuit is provided for energizing the energy applicator and causing a change in refractive index to arise in the wave guide layer and/or the adjacent layer so that a wave guided inside of the wave guide layer is radiated out of the stack by interaction with the dielectric grating. In a wave guide device, the wave guide layer is formed of a thermo-optic material in which the thermal coefficient of refractive index is zero or negative, and the adjacent layer is formed of a thermo-optic material exhibiting a positive thermal coefficient of refractive index.

9 Claims, 7 Drawing Sheets

LIGHT MODULATOR AND WAVE GUIDE DEVICE

BACKGROUND OF THE INVENTION

1. Field of the Invention

This invention relates to a light modulator, particularly a light modulator for modulating light by controlling take-up of a guided wave from a wave guide. This invention also relates to a wave guide device, particularly a wave guide device comprising a wave guide layer formed of a thermo-optic material whose optical refractive index changes with heat so that a wave guide inside of the wave guide layer is radiated therefrom for use in light beam scanning, light modulation or the like.

2. Description of the Prior Art

As light modulators for external modulation of a light beam such as a laser beam, electro-optic modulators (EOM), acousto-optic modulators (AOM) and the like have heretofore been known. In recent years, wave guide type light modulators using a thermo-optic material have also been proposed. One of the wave guide type light modulators is described in Appl. Phys. Lett., Vol. 45, P840 (1984). In this light modulator, the mode is switched between guided mode and radiation mode by the controlled application of an electric field or the like to the wave guide, and wave radiated out of the wave guide is thereby modulated.

However, the light modulator having the aforesaid configuration has the drawback that, since the efficiency of wave take-up from the wave guide in the radiation mode is low, a substantially high extinction ratio is not obtained.

SUMMARY OF THE INVENTION

The primary object of the present invention is to provide a wave guide type light modulator which provides a substantially high extinction ratio.

Another object of the present invention is to provide a wave guide device which comprises a wave guide layer and an adjacent layer formed of a thermo-optic material and which is suitable for constituting a light modulator, a light beam scanning apparatus or the like.

The specific object of the present invention is to provide a wave guide device which provides a high efficiency of heating energy utilization for changing the optical refractive index.

The present invention provides a light modulator comprising:

(i) a stack of a wave guide layer and an adjacent layer normally exhibiting an optical refractive index smaller than the optical refractive index of said wave guide layer and closely contacted with said wave guide layer, at least either one of said wave guide layer and said adjacent layer being formed of a material whose optical refractive index changes through the application of energy, (ii) an energy application means positioned at said wave guide layer and/or said adjacent layer along an optical path of guided wave advancing inside of said wave guide layer, (iii) a dielectric grating positioned at the surface of said adjacent layer at least over a portion thereof corresponding to the section where energy is applied by said energy application means, and (iv) a drive circuit for energizing said energy application means to a predetermined energy application condition, and changing the optical refractive index of said wave guide layer and/or the optical refractive index of said adjacent layer so that said guided wave is radiated out of said stack by interaction with said dielectric grating at said section where energy is applied by said energy application means.

The present invention also provides a wave guide device comprising:

(i) a stack of a wave guide layer formed of a thermo-optic material in which the thermal coefficient of the optical refractive index is zero or negative (i.e. the optical refractive index does not change or decreases by heating), and an adjacent layer formed of a thermo-optic material in which the thermal coefficient of the optical refractive index is positive (i.e. the optical refractive index increases by heating) and which exhibits an optical refractive index smaller than the optical refractive index of said wave guide layer when heating is not effected, (ii) a heating means positioned at a surface of said adjacent layer so as to heat a predetermind section along an optical path of guided wave advancing inside of said wave guide layer, and (iii) a dielectric grating provided at the surface of said adjacent layer at said heating section.

With the light modulator in accordance with the present invention, since the guided wave advancing inside of the wave guide layer is efficiently taken out of the wave guide layer by the action of the dielectric grating provided at the adjacent layer closely contacted with the wave guide layer, it is possible to substantially improve the extinction ratio of modulated light.

In the light modulator of the present invention, the optical refractive index n2 of the wave guide layer and/or the optical refractive index n1 of the adjacent layer, where n2>n1 in the normal condition without application of energy, is changed so that the difference n2−n1 becomes small or so that n2≦n1. The field distribution of the guided wave confined in the wave guide layer is thereby changed, and the guided wave is radiated out of the stack of the wave guide layer and the adjacent layer by the interaction with the dielectric grating. Therefore, by controlling the application of energy, it is possible to control take-up of the guided wave out of the stack, and to modulate the light radiated out of the wave guide layer. Specifically, the intensity of the light radiated from the wave guide layer decreases when the guided wave is taken out of the stack, and increases when take-up of the guided wave is ceased. Also, since take-up of the guided wave out of the stack is controllable, it is also possible to use the taken-up light as modulated light.

Figure 1:
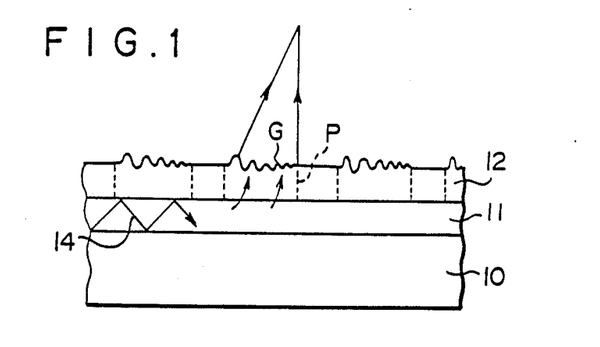
FIG. 1 is an explantory view showing the mechanism of the light modulation in the light modulator of the present invention.

The mechanism of the guided wave taken out of the stack will now be described in detail. FIG. 1 is an explanatory view showing the light modulation in the apparatus of the present invention. For example, as shown in FIG. 1, the light modulator in accordance with the present invention comprises a substrate 10, a wave guide layer 11 overlaid on the substrate 10, and an adjacent layer 12 provided with a dielectric grating G and overlaid on the wave guide layer 11. By way of example, the adjacent layer 12 is formed of a thermo-optic material. The optical refractive index n3 of the substrate 10, the optical refractive index n2 of the wave guide layer 11, and the optical refractive index n1 of the adjacent layer 12 when no electric field is applied satisfy the condition n2>n1, n3.

Figure 2A:
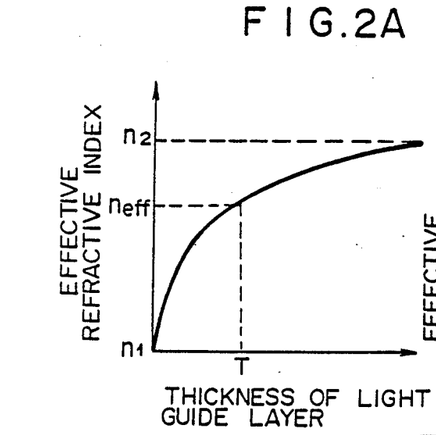
FIGS. 2A, 2B and 2C are graphs showing the dispersion curves in the configuration of FIG. 1, FIGS. 3A, 3B and 3C are schematic views showing the electric field distribution of guided wave in the configuration of FIG. 1.
Figure 2B:
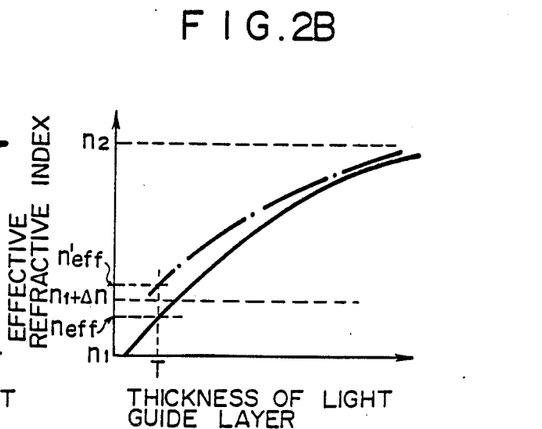
Figure 2C:
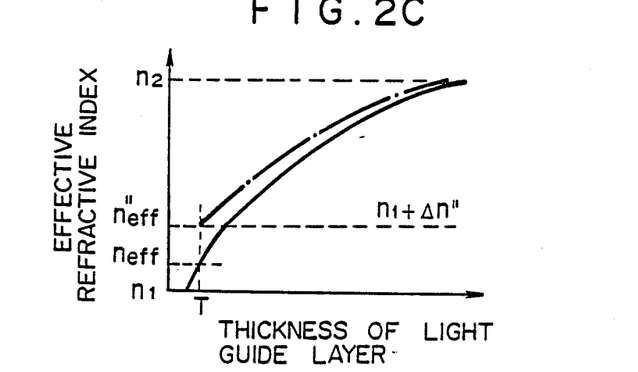

FIGS. 2A, 2B and 2C are graphs showing the dispersion curves in the configuration shown in FIG. 1. FIGS.

Figure 3A:
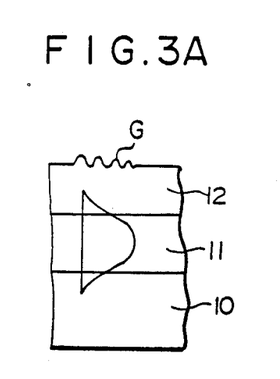

3A, 3B and 3C are schematic views showing the electric field distribution of guided wave in the configuration of FIG. 1. In the configuration of FIG. 1, the dispersion curve when no electric field is applied is shown in FIG. 2A. In FIG. 2A, the ordinate axis denotes the effective optical refractive index, and the abscissa axis denotes the thickness of the wave guide layer 11. When the thickness of the wave guide layer 11 is T, the effective optical refractive index of the wave guide layer 11 is neff. At this time, the field distribution (electric field distribution) of the guided wave 14, for example, in the TEo mode, becomes as shown in FIG. 3A. As shown in FIG. 3A, though the guided wave slightly spreads to the adjacent layer 12 and the substrate 10, it does not interact with the dielectric grating G, and advances inside of the wave guide layer 11 without leaking out of the stack.

Figure 3B:
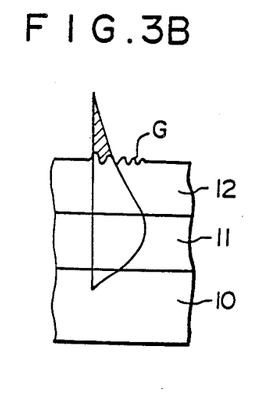

Then, an electric field is applied between electrodes of an electrode pair (not shown in FIG. 1) positioned on the adjacent layer 12 directly or via an intermediate layer. In this manner, the optical refractive index of the adjacent layer 12 at the section corresponding to the space P between the electrodes is increased from n1 to n1+Δn. At this time, the dispersion curve becomes as indicated by the chain line in FIG. 2B, and the effective optical refractive index neff of the wave guide layer 11 increases to n'eff. In this case, the electric field distribution of the guided wave changes as shown in FIG. 3B. Namely, the guided wave spreading to the adjacent layer 12 increases to an extent substantially interacting with the dielectric grating G. As a result, the spreading light indicated by the hatching in FIG. 3B is radiated and advances upwardly (or downwardly, or upwardly and downwardly, depending on the type of the dielectirc grating G), and ultimately almost all of the guided wave is radiated out of the stack.

Figure 3C:
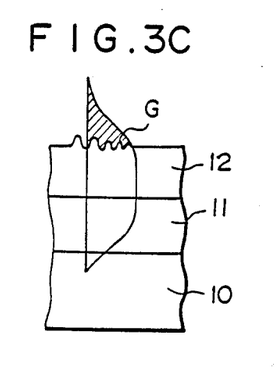

Also, in the configuration of FIG. 1, when the optical refractive index of the adjacent layer 12 is changed from n1 to n1+Δn″ which is nearly equal to the effective optical refractive index n″eff of the wave guide layer 11 changing as the optical refractive index of the adjacent layer 12 is changed, the dispersion curve becomes as indicated by the chain line in FIG. 2C, and the guided wave changes from the guided mode to the radiation mode and shifts to the adjacent layer 12. In this case, the electric field distribution of the guided wave changes as shown in FIG. 3C. Namely, the guided wave leaks to the adjacent layer 12, and is radiated and advances upwardly (and/or downwardly) by the interaction with the dielectric grating G. Thus the guided wave is quickly radiated out of the stack. Also, by changing the optical refractive index n1 of the adjacent layer 12 to a value approximately equal to or larger than the optical refractive index n2 of the wave guide layer 11, it is possible to change the total reflection conditions of the wave guided inside of the wave guide layer 11, thereby shifting the guided wave to the adjacent layer 12, and to radiate it out of the stack by the interaction with the dielectric grating G.

Instead of constituting the adjacent layer 12 by use of the thermo-optic material and changing its optical refractive index, it is also possible to constitute the wave guide layer 11 by use of a thermo-optic material, to position the electrode pair at the wave guide layer 11, and to change (decrease) the optical refractive index of the wave guide layer 11. Or, both of the wave guide layer 11 and the adjacent layer 12 may be constituted by use of a thermo-optic material and provided with the electrode pair, and the optical refractive indexes of the wave guide layer 11 and the adjacent layer 12 may be change.

When the light radiated out of the stack is to be used as modulated light, the dielectric grating G should preferably be formed as a focusing grating coupler. In this case, the light radiated out of the stack converges to a single spot, and it becomes possible to prevent light dissipation.

The wave guide device in accordance with the present invention is applicable to a light beam scanning apparatus used in a light beam scanning recording apparatus, a light beam scanning read-out apparatus or the like. When the wave guide device is applied to the light beam scanning apparatus, it is possible to constitute the light beam scanning apparatus so that a single light source is used. Therefore, with the wave guide device of the present invention, the problem of fluctuations in light emission intensity of the light source as in the case of an LED array or the like does not arise, and it is possible to conduct scanning accurately and to improve the light utilization efficiency of the light source. Also, since no mechanical operating section is used, the wave guide device exhibits high durability and high resistance to vibration, and is easy to adjust. Further, since scanning can be conducted without greatly swinging the light beam, it becomes possible to prevent the light beam scanning system from becoming large and to make the light beam scanning recording apparatus or the light beam scanning read-out apparatus small.

Also, with the wave guide device in accordance with the present invention, since the guided wave may be efficiently taken out of the wave guide layer by the dielectric grating, it becomes possible to improve the extinction ratio substantially when the device is applied to a light modulator.

Further, since the adjacent layer and the wave guide layer are formed respectively of a thermo-optic material in which the thermal coefficient of the optical refractive index is positive and a thermo-optic material in which the thermal coefficient of the optical refractive index is zero or negative, it is possible to radiate the light out of the adjacent layer by causing relatively small temperature changes to arise in these layers, and to minimize the heating energy requirement.

With the wave guide device, the light beam scanning apparatus may be fabricated by providing a plurality of the heating means for respectively heating a plurality of the heating sections positioned in a line, and a drive circuit for sequentially and selectively energizing the heating means to a predetermined heating condition. Also, the light modulator may be fabricated with the wave guide device by providing a single heating means and a drive circuit for energizing the heating means to a predeterined heating condition on the basis of an image signal or the like.

In the wave guide device, when the adjacent layer is heated by the heating means, the wave guide layer is also heated, and the relationship n2>n1 in the normal condition (in the non-heating condition in this case) between the optical refractive index n2 of the wve guide layer and the optical refractive index n1 of the adjacent layer is changed so that the difference n2−n1 becomes small or so that n2≦n1. Therefore, it is possible to take the guided wave out of the stack. Also, since a thermo-optic material in which the thermal coefficient of the optical refractive index is zero or negative is used for forming the wave guide layer and a thermo-optic material in which the thermal coefficient of the optical refractive index is positive is used for forming the adjacent layer, it is possible to make the difference n2−n1 substantially small or adjust to n2≦n1 without so much heating of the adjacent layer and the wave guide layer.

DESCRIPTION OF THE PREFERRED EMBODIMENTS

The present invention will hereinbelow be described in further detail with reference to the accompanying drawings.

Figure 4:
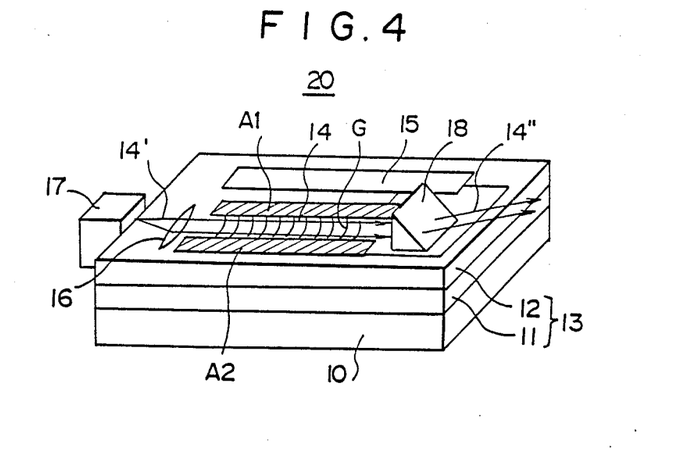
FIG. 4 is a perspective view showing an embodiment of the light modulator in accordance with the present invention.

Referring to FIG. 4, a light modulator 20 comprises a substrate 10, and a stack 13 positioned on the substrate 10. The stack 13 is constituted by a wave guide layer 11 and an adjacent layer 12 closely contacted with the wave guide layer 11. By way of example, the adjacent layer 12 is formed of a thermo-optic material. The wave guide layer 11, the adjacent layer 12 and the substrate 10 are constituted by materials satisfying the condition n2>n1, n3 where n2 and n3 respectively denote the optical refractive indexes of the wave guide layer 11 and the substrate 10, and n1 denotes the optical refractive index of the adjacent layer 12 when no electric field is applied, so that the light may advance inside of the wave guide layer 11. The combination of the materials of the wave guide layer 11, the adjacent layer 12 and the substrate 10 may be [$Nb_2O_5$:$K_3Li_2Nb_5O_{15}$:glass], [$Nb_2O_5$:$LiNbO_3$:glass], or the like. The wave guide configurations are described in detail, for example, in T. Tamir, "Integrated Optics", Topics in Applied Physics, Vol. 7, Springer-Verlag, 1975, and Nishibara et al., "Integrated Optical Circuit", Ohm, 1985. In the present invention, any of the known wave guide configurations may be used as the combination of the wave guide layer 11, the adjacent layer 12, with the substrate 10. By way of example, the thickness of the wave guide layer 11 may be within the range of 0.5 $\mu$m to 10 $\mu$m, the thickness of the adjacent layer 12 may be within the range of 1 $\mu$m to 50 $\mu$Lm, and the thickness of the substrate may be 1 $\mu$m or larger.

A pair of electrodes A1 and A2 are provided in the adjacent layer 12. The electrodes A1 and A2 are positioned so that the space therebetween is, for example, within the range of approximately b 10 $\mu$m to approximately 5 mm, and are connected to a driver 15 provided on the substrate 10. The driver 15 may be provided independently of the substrate 10. A dielectric grating G is provided on the surface of the adjacent layer 12 at the position corresponding to the space between the electrodes A1 and A2.

On the other hand, the wave guide layer 11 is provided with a wave guide lens 16 at the extension of the space between the electrodes A1 and A2. The substrate 10 is provided with a semiconductor laser 17 for emitting a laser beam 14' toward the wave guide lens 16 in the wave guide layer 11.

The light modulator 20 constituted as mentioned above is operated as described below. When the laser beam 14' is used, for example, for image recording or optical communication, the semiconductor laser 17 is activated to emit the laser beam 14' into the wave guide layer 11. The laser beam 14' is converted by the wave guide lens 16 into a laser beam 14 of parallel rays which advances at the section between the elctrodes A1 and A2 inside of the wave guide layer 11 in the guided mode. The laser beam (guided wave) 14 advancing inside of the wave guide layer 11 is radiated out of the wave guide layer 11, for example, via a coupler prism 18.

A predetermined voltage is applied across the electrodes A1 and A2 by the driver 15, for example, based on an image signal. When an electric field is thus applied to the space between the electrodes A1 and A2, the optical refractive index of the adjacent layer 12 at the section at which the electric field has been applied increases. As a result, the guided laser beam 14 is radiated from the wave guide layer 11 to the adjacent layer 12 at the section corresponding to the space between the electrodes A1 and A2, and is radiated out of the adjacent layer 12 by the diffracting action of the dielectric grating G as mentioned above. When a part of the guided laser beam 14 is thus radiated out of the wave guide layer 11, the intensity of a laser beam 14" radiated out of the coupler prism 18 decreases proportionally. Therefore, when the voltage application across the electrodes A1 and A2 is controlled, it is possible to modulate the emitted laser beam 14". Since take-up of the guided laser beam 14 by the interaction between the guided laser beam 14 which spreads out and the dielectric grating G is effected at a high efficiency sufficient to take up almost all of the guided laser beam 14, it is possible to substantially improve the extinction ratio of the emitted laser beam 14" which is the modulated light.

Instead of directly coupling the semiconductor laser 17 with the wave guide layer 11, the laser beam may be made to impinge upon the wave guide layer 11 via a lens, a coupler prism, a grating coupler or the like. Also, in order to emit the laser beam 14", which is the modulated light, out of the wave guide layer 11, any element other than the coupler prism 18 may be used. The semiconductor laser 17 may also be formed integrally with the wave guide layer 11 when the wave guide layer 11 is formed. The light source for emitting the scanning light is not limited to the semiconductor laser 17, and may be a gas laser, a solid laser or the like.

Figure 6:
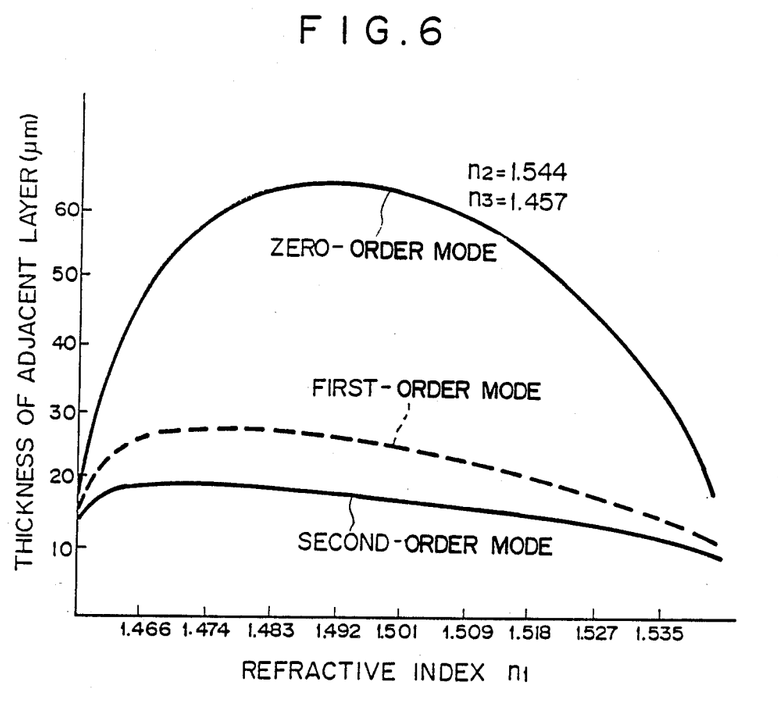
FIG. 6 is a graph showing the relationship between the optical refractive index of the adjacent layer and the thickness thereof in the guided mode.
Figure 7:
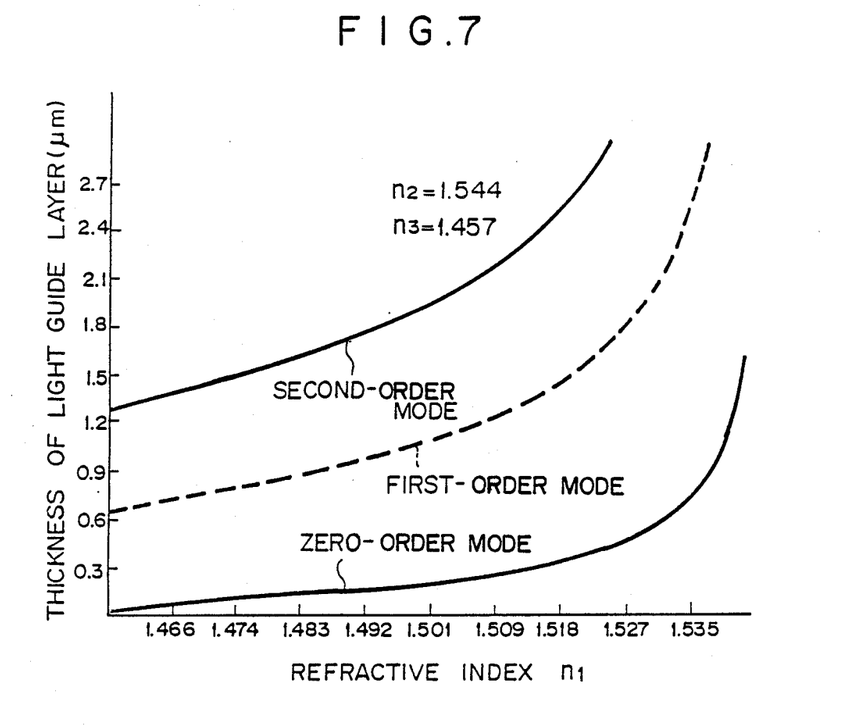
FIG. 7 is a graph showing the relationship between the optical refractive index of the adjacent layer and the thickness of the wave guide layer in the guided mode.

In this embodiment, the semiconductor laser 17 is coupled with the wave guide layer 11 so that the laser beam 14 is guided inside of the wave guide layer 11, for example, in the first-order mode. FIGS. 6 and 7 respectively show the relationship between the optical refractive index n1 and the thickness of the adjacent layer 12, and the relationship between the optical refractive index n1 of the adjacent layer 12 and thickness of the wave guide layer 11 in various orders of guided modes when the optical refractive index n2 is 1.544 and the optical refractive index n3 is 1.457. As is clear from FIGS. 6 and 7, when the optical refractive index n1 is, for example, 1.518, the thickness of the adjacent layer 12 is approximately 55 $\mu m$ and the thickness of the wave guide layer 11 is approximately 0.4 $\mu m$ in the zero-order mode. In the first-order mode, the thickness of the adjacent layer 12 is approxmately 22 $\mu m$, and the thickness of the wave guide layer 11 is approximately 1.5 $\mu m$. Thus the thickness of the adjacent layer 12 in the first-order guided mode is less than half the thickness thereof in the zero-order guided mode. Further, the ratio of the thickness of the adjacent layer 12 to the thickness of the wave guide laye 11 is approximately 138 (=55/0.4) in the zero-order mode, and is approximately 15 (=22/1.5) in the first-orde mode.

In the embodient wherein the guided mode is adjusted to the first-order mode, since the thickness of the adjacent layer 12 becomes substantially smaller than that in the case where the guided mode is the zero-order mode, formation of the adjacent layer 12 by sputtering or the like becomes easy. Further, since the difference between the thickness of the wave guide layer 11 and the thickness of the adjacent layer 12 becomes very small, it is possible to eliminate the problem that formation of the layers becomes difficult due to a difference in thermal expansion between the wave guide layer 11 and the adjacent layer 12.

In this embodiment, the order of the guided mode is not limited to the first order, and may be the zero order. However, as is clear from FIGS. 6 and 7, larger effects are obtained when the guided mode is adjusted to a higher order. Also, since the interaction between the dielectric grating G and the guided laser beam 14 increases as the order of the guided mode is adjusted to be higher, the guided mode should preferably be adjusted to be a higher order also for improving the guided wave take-up efficiency from the wave guide layer 11.

Figure 5:
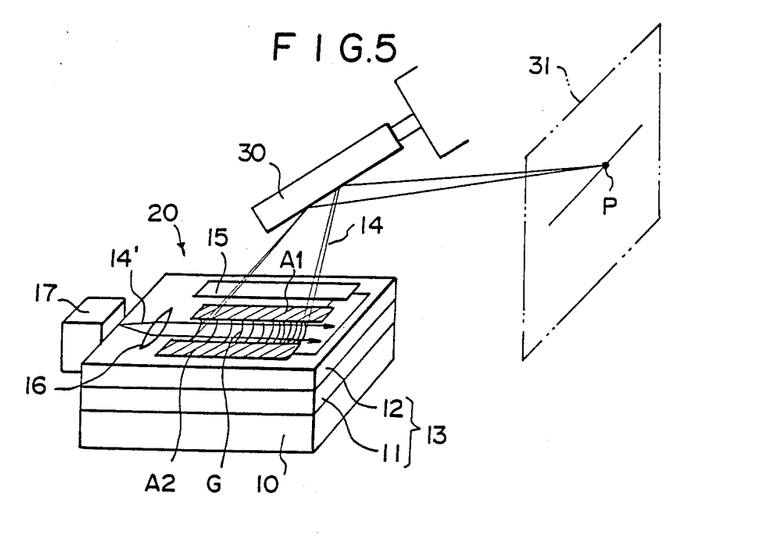
FIG. 5 is a perspective view showing another embodiment of the light modulator in accordance with the present invention.

Another embodiment of the light modulator in accordance with the present invention will hereinbelow be described with reference to FIG. 5. In FIG. 5, similar elements are numbered with the same reference numerals with respect to FIG. 4. In this embodiment, the dielectric grating G positioned on the surface of the adjacent layer 12 is fabricated as a focusing grating coupler, and the laser beam 14 radiated from the dielectric grating G is converged to a single spot. The focusing grating coupler G is formed by positioning grid patterns like a curve of second order in the direction of advance of the laser beam 14 inside of the wave guide layer 11, and changing the curvature of each pattern and the pattern pitch so that the converging action is obtained. The focusing grating coupler is described in detail, for example, in Technical Research Report OQC83-84, The Institute of Electronics and Communcation Engineers of Japan, pages 47 to 54.

The laser beam 14 converged to a single spot is deflected by a light deflector 30 which is constituted by a galvanometer mirror or the like so that a converged spot P of the laser beam 14 scans a light-sensitive material 31 in one direction (main scanning direction). Therefore, when the light-sensitve material 31 is moved simultaneously in a subscanning direction approximately normal to the main scanning direction, it is scanned two-dimensionally by the converged spot P. Also, when the voltage application across the electrodes A1 and A2 is controlled as in the embodiment of FIG. 4, the laser beam (scanning light) 14 radiated out of the dielectric grating G is modulated, and it is possible to record an image by the emitted laser beam 14 on the light-sensitive material 31.

In the embodiment of FIG. 5, the laser beam 14 radiated out of the dielectric grating G is utilized as modulated light. Therefore, the coupler prism 18 in the embodiment of FIG. 4 or the like need not be used to emit the laser beam 14, which passes through the space between the electrodes A1 and A2 and advances inside of the wave guide layer 11, out of the wave guide layer 11.

Embodiments of the wave guide device in accordance with the present invention will hereinbelow be described with reference to FIGS. 8 to 12. In FIGS. 8 to 12, similar elements are numbered with the same reference numerals with respect to FIGS. 4 and 5.

Figure 8:
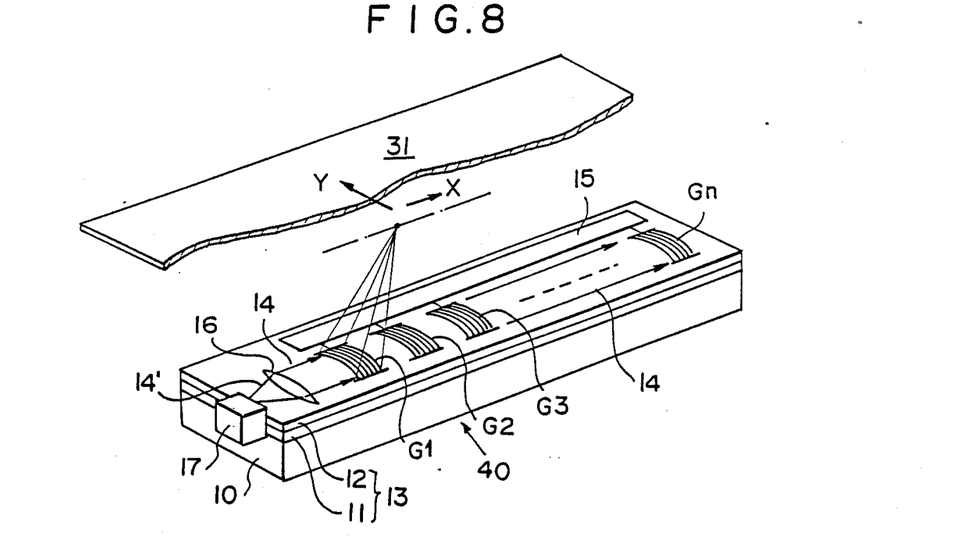
FIG. 8 is a perspective view showing a light beam scanning apparatus constituted by use of an embodiment of the wave guide device in accordance with the present invention.

Referring to FIG. 8 showing a light beam scanning apparatus 40 constituted by using an embodiment of the wave guide device in accordance with the present invention, the wave guide layer 11 is formed of a thermo-optic material in which the thermal coefficient of the optical refractive index is zero or negative, and the adjacent layer 12 is formed of a thermo-optic material in which the thermal coefficient of the optical refractive index is positive. The wave guide layer 11, the adjacent layer 12, and the substrate 10 are formed of materials satisfying the condition $n2>n1$, $n3$ where $n3$ denotes the optical refractive index of the substrate 10, and $n1$ and $n2$ respectively denote the optical refractive indexes of the adjacent layer 12 and the wave guide layer 11 in the unheated condition. As the combination of the adjacent layer 12, the wave guide layer 11, with the substrate 10, there may be used, for example, optical glass KF9 ($+2.9 \times 10^{-6}/°$ C.), BAK2 ($-0.1 \times 10^{-6}/°$ C.), and FK3 ($-2.0 \times 10^{-6}/°$ C.) supplied by Schot Company, West Germany, wherein the optical refractive indexes n1, n2 and n3 with respect to an He-Ne laser beam having a wavelength of 632.8 nm are respectively 1.52, 1.54 and 1.46; optical glass PK2 ($+1.4 \times 10^{-6}/°$ C.), KF1 ($-0.4 \times 10^{-6}/°$ C.), and FK3; optical glass BK7 ($+1.2 \times 10^{-6}/°$ C.), BAK2 ($-0.1 \times 10^{-6}/°$ C.), and FK3; optical glass KF9 ($+2.9 \times 10^{-6}/°$ C.), BAK2 ($0.0 \times 10^{-6}/°$ C.), and FK3, or the like, wherein the value in the parenthesis denotes the absolute thermal coefficient $\Delta n/\Delta T$ at $+20°$ C. to $+40°$ C. As the thermo-optic material, it is also possible to use a crystal, a plastic material, or the like insofar as the requirements for the optical refractive index and changes in optical refractive index with temperature are satisfied.

On the surface of the adjacent layer 12, dielectric gratings G1, G2, G3, ..., Gn fabricated of a transparent electro-thermal material are arrayed in a line. As the transparent electro-thermal material, it is possible to use, for example, a material constituted by $In_2O_3$ and SnO$_2$. The sizes of the dielectric gratings G1, G2, G3, . . . , Gn may, for example, be within the range of approximately 10×10 μm to 0.2×5 mm, and the distances therebetween may be within the range of approximately 100 μm. The grating elements constituting each of the dielectric gratings G1, G2, G3, . . . , Gn are electrically connected to each other at opposite ends thereof, and the dielectric gratings G1, G2, G3, . . . , Gn are connected to the drive 15 formed on the substrate 10.

On the other hand, the wave guide layer 11 is provided with the wave guide lens 16 on the extension of the array direction of the dielectric gratings G1, G2, G3, . . . , Gn.

Figure 9:
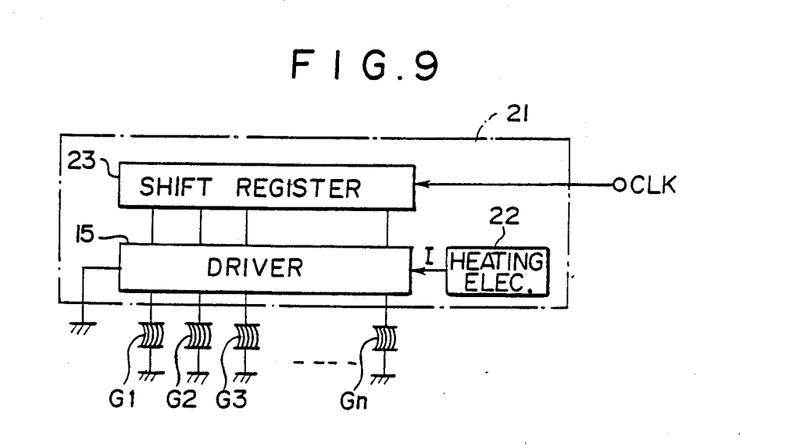
FIG. 9 is a block diagram showing the electric circuit in the light beam scanning apparatus of FIG. 8, FIGS. 10 and 11 are side views showing the major parts of further examples of the light beam scanning apparatus constituted by use of the wave guide device in accordance with the present invention.

FIG. 9 shows a drive circuit 21 for the light beam scanning apparatus 40. Operations of the light beam scanning apparatus 40 will be now be described with reference to FIGS. 8 and 9. The laser beam 14' emitted by the semiconductor laser 17 into the wave guide layer 11 is converted to the laser beam 14 of parallel rays by the wave guide lens, and the laser beam 14 advances inside of the wave guide layer 11 in the guided mode in the array direction of the dielectric gratings G1, G2, G3, . . . , Gn as shown in FIG. 8. A current I is supplied by a heating electric power source 22 to the dielectric gratings G1, G2, G3, . . . , Gn via the driver 15. The driver 15 is activated by the output of a shift register 23 operated in synchronization with a clock signal CLK, and sequentially selects the dielectric gratings G1, G2, G3, . . . , Gn one by one for the supply of the current I. Specifically, the current I is first applied to the first dielectric grating G1, then to the second dielectric grating G2, and so on. When the current I is supplied sequentially to the dielectric gratings G1, G2, G3, . . . , Gn, they sequentially generate heat, and the adjacent layer 12 and the wave guide layer 11 are heated at the section facing the heated dielectric rating. As a result, the optical refractive index of the adjacent layer 12 increases, and the optical refractive index of the wave guide layer 11 decreases. Accordingly, the guided laser beam 14 is radiated from the wave guide layer 11 to the adjacent layer 12 at the section where the optical refractive indexes have changed, and is radiated out of the adjacent layer 12 by the diffracting action of the dielectric gratings G1, G2, G3, . . . Gn. Thus the position of emission of the laser beam 14 from the adjacent layer 12 sequentially changes from the dielectric grating G1 to the dielectric grating G2, . . . , to the dielectric grating Gn, then to the dielectric rating G1, and so on. Therefore, the scanning material 31 is scanned by the emitted laser beam 14 in the main scanning direction as indicated by the arrow X in FIG. 8. [Application of the current to the dielectric gratings G1, G2, G3, . . . , Gn may also be controlled so that the position of emission of the laser beam 14 changes in the sequence of the dielectric grating G1→G2→. . . . Gn→G(n−1)→G(n−2) . . . . ] While the scanning material 31 is scanned in the main scanning direction, it is moved in the sub-scanning direction as indicated by the arrow Y in FIG. 8 in synchronization with the scanning in the main scanning direction by use of the clock signal CLK. In this manner, the scanning material 31 is scanned in two directions.

Since the adjacent layer 12 and the wave guide layer 11 are formed respectively of a thermo-optic material in which the thermal coefficient of the optical refractive index is positive, and a thermo-optic material in which the thermal coefficient of the optical refractive index is zero or negative, it is possible to make the laser beam 14 come out of the adjacent layer 12 by only slightly heating the layers 11 and 12.

In this embodiment, the dielectric gratings G1, G2, G3, . . . , Gn positioned on the surface of the adjacent layer 12 are constituted as focusing grating couplers, and the laser beam 14 radiated from the dielectric gratings G1, G2, G3, . . . , Gn is converged to a single spot on the scanning material 31.

Figure 10:
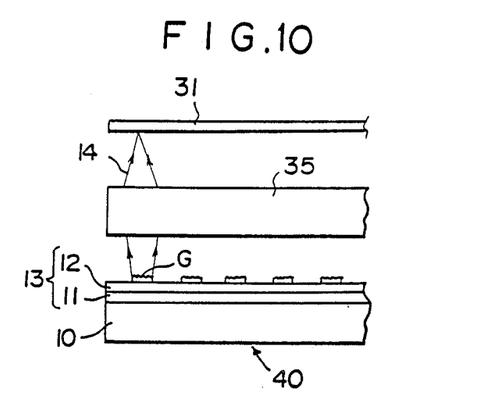
Figure 11:
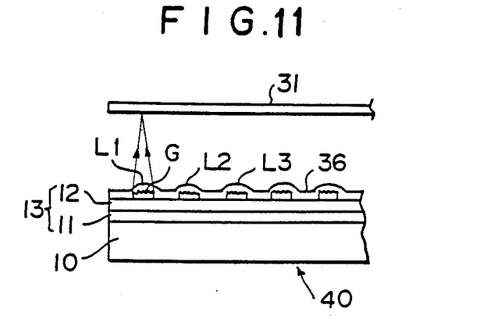

As shown in FIG. 10, in order to converge the laser beam 14 radiated from the adjacent layer 12 to a single spot, instead of forming the dielectric ratings G1, G2, G3, . . . , Gn as the focusing grating couplers, a lens array 35 constituted by a SELFOC lens array or the like may be positioned between the light beam scanning apparatus 40 and the scanning material 31. Also, as shown in FIG. 11, a lens array layer 36 comprising lenses L1, L2, L3, . . . , Ln may be provided on the adjacent layer 12 so that the lenses correspond to the positions of the dielectric gratings G1, G2, G3, . . . Gn. In this case, the lenses L1 to Ln may be formed as ordinary convex lenses as shown in FIG. 11, or as distributed index lenses constituted by distributing the refractive index of the array layer material. Alternatively, the laser beam 14 may be converged by both of the lens array 35 or the lens array layer 36 and the focusing grating couplers. However, only the focusing grating couplers should preferably be used for simplifying the configuration of the light beam scanning apparatus. The laser beam 14 radiated from the adjacent layer 12 need not necessarily be converged as described above, and the scanning material 31 may be scanned by parallel rays or divergent rays.

In the aforesaid embodiment of the wave guide device, the stack 13 of the wave guide layer 11 and the adjacent layer 12 is positioned oon the substrate 10. However, the substrate 10 may be omitted, and the wave guide layer 11 may be provided to directly contact the ambient atmosphere. Or, the adjacent layer 12 may be overlaid on the two surfaces of the wave guide layer 11, the scanning light may be emitted to the upper and lower sides of the wave guide layer 11, and two scanning surfaces may be scanned by the scanning light at the same time.

Also, in the aforesaid embodiment of the wave guide device, the wave guide layer 11 and the adjacent layer 12 are heated by the dielectric gratings G1, G2, G3, . . . , Gn fabricated of the electro-thermal material. However, it is also possible to heat the predetermined sections by providing the heating means so as to sandwich the heating sections from two sides or to surround them on four sides.

The light beam scanning apparatus wherein the wave guide device in accordance with the present invention is used may be constituted so that a plurality of lines each comprising the dielectric gratings G1, G2, G3, . . . , Gn as the scanning light take-up section are provided, and a plurality of scanning light beams are taken up simultaneously.

Figure 12:
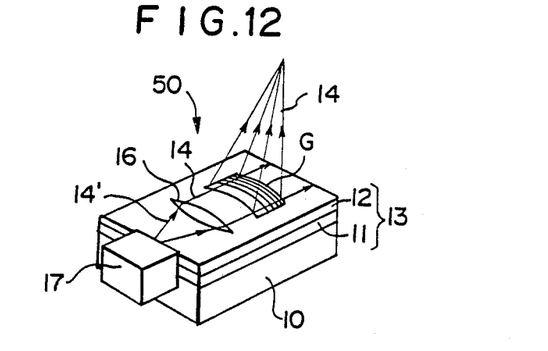
FIG. 12 is a perspective view showing a light modulator constituted by use of another embodiment of the wave guide device in accordance with the present invention.

Though the wave guide device in accordance with the present invention is described herein by taking the embodiments for constituting the light beam scanning apparatus as an example, the wave guide device may also be formed to constitute a light modulator. FIG. 12 shows a light modulator 50 constituted by use of another embodiment of the wave guide device in accordance with the present invention. The stack 13 constituting the light modulator 50 is provided with a single, relatively large dielectric grating G positioned on the adjacent layer 12. Also in this configuration, the laser beam 14 is radiated out of the stack 13 when the dielectric grating G is heated. Therefore, when the heating current application to the dielectric grating G is controlled based on an image signal or the like, the laser beam 14 radiated out of the stack 13 is modulated in conformity with the image signal or the like. In this case, the laser beam 14 radiated out of the stack 13 in this manner may be used as modulated light. Alternatively, the laser beam passing though the dielectric grating G and advancing inside of the wave guide layer 11 may be taken out of the wave guide layer 11 by use of a coupler prism or the like and used as modulated light.

We claim:

1. A light modulator comprising:
   (i) a stack of a wave guide layer and an adjacent layer normally exhibiting an optical refractive index smaller than the optical refractive index of said wave guide layer and closely contacted with said wave guide layer, at least either one of said wave guide layer and said adjacent layer being formed of a thermo-optic material whose optical refractive index changes through the application of energy.
   (ii) an energy application means for applying thermal energy to said thermo-optic material, said energy application means being positioned adjacent at least one of said wave guide layer and said adjacent layer along an optical path of a guided wave advancing inside of said wave guide layer,
   (iii) a dielectric grating positioned at the surface of said adjacent layer at least over a portion thereof corresponding to the section where energy is applied by said energy application means, and
   (iv) a drive circuit for energizing said energy application means to a predetermined energy application condition, said predetermined energy application condition changing at least one of the optical refractive index of said wave guide layer and the optical refractive index of said adjacent layer so that said guided wave is radiated out of said stack by interaction with said dielectric grating at said section where energy is applied by said energy application means.

2. A light modulator as defined in claim 1 wherein said energy application means is an electrode pair, said section where energy is applied is an electrode space between electrodes of said electrode pair, and said drive circuit is constituted to apply an electric field between the electrodes of said electrode pair.

3. A light modulator as defined i claim 1 or 2 wherein the guided mode of said guided wave is adjusted to a high-order mode.

4. A light modulator as defined in claim 1 or 2 wherein said dielectric grating is a focusing grating coupler.

5. A wave guide device comprising:
   (i) a stack of a wave guide layer formed of a thermo-optic material in which the thermal coefficient of the optical refractive index is zero or negative, and an adjacent layer formed of a thermo-optic material in which the thermal coefficient of the optical refractive index is positive and which exhibits an optical refractive index smaller than the optical refractive index of said wave guide layer when heating is not effected,
   (ii) a heating means positioned at a surface of said adjacent layer so as to heat a predetermined section along an optical path of guided wave advancing inside of said wave guide layer, and
   (iii) a dielectric grating provided at the surface of said adjacent layer at said heated section.

6. A wave guide device as defined in claim 5 wherein a plurality of said heating means are provided for respectively heating a plurality of said heating sections arrayed in a line.

7. A wave guide device as defined in claim 5 or 6 wherein said dielectric grating is formed of a transparent thermo-optic material, and said heating means is constituted by said dielectric grating.

8. A wave guide device as defined in claim 5 or 6 wherein said dielectric grating is a focusing grating coupler.

9. A wave guide device as defined in claim 5 or 6 wherein a lens layer is provided on said adjacent layer at a position corresponding to said dielectric grating.

* * * * *